A. E. D'HARLINGUE.
SIGNALING DEVICE FOR VEHICLES.
APPLICATION FILED JUNE 7, 1916.
1,237,486.  Patented Aug. 21, 1917.
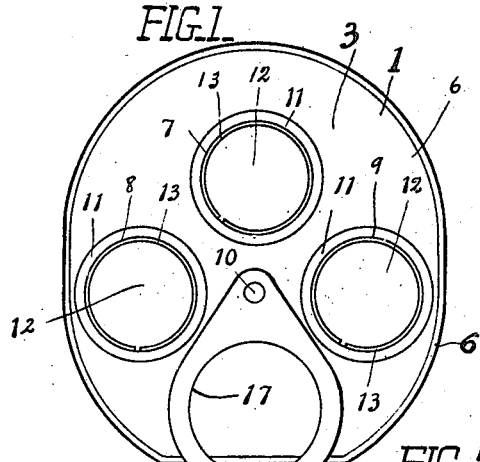
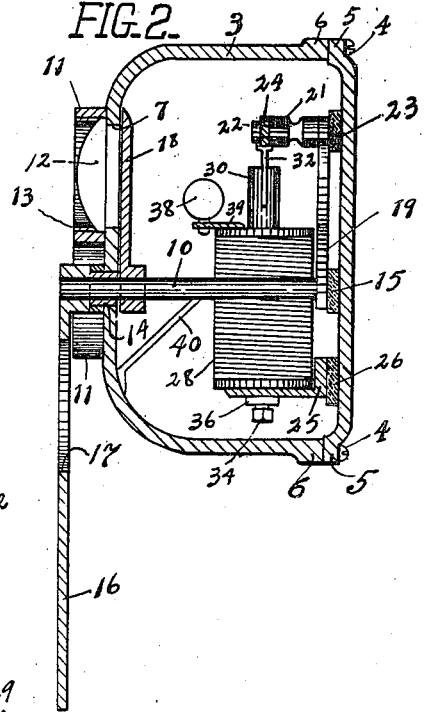
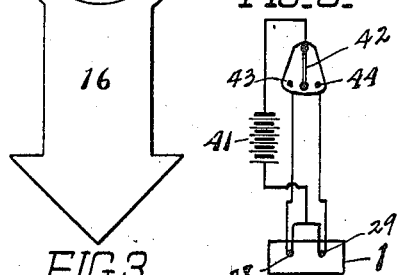
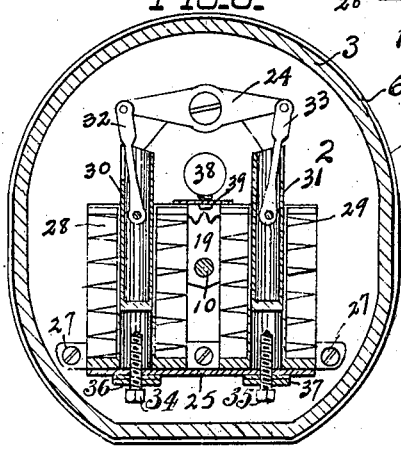
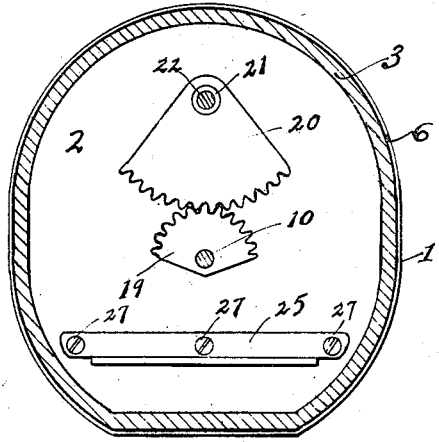
INVENTOR:
Alfred E. D'Harlingue,
BY Hugh K. Wagner
ATTORNEY.

UNITED STATES PATENT OFFICE.

ALFRED E. D'HARLINGUE, OF ST. LOUIS, MISSOURI.

SIGNALING DEVICE FOR VEHICLES.

1,237,486.  Specification of Letters Patent.  Patented Aug. 21, 1917.

Application filed June 7, 1916. Serial No. 102,165.

*To all whom it may concern:*

Be it known that I, ALFRED E. D'HARLINGUE, a citizen of the United States, residing at the city of St. Louis, in the State of Missouri, have invented certain new and useful Improvements in Signaling Devices for Vehicles, of which the following is a specification.

This invention relates to signaling devices for vehicles and has for its object to provide a simple device of the character described that is effective in operation for the purpose for which it is designed to be used.

Another object is to provide a signaling device of the character described adapted for use in daylight or at night.

Another object is to provide a device of the character described that is adapted to be operated by means of energizing and deenergizing one or the other of a pair of solenoids.

An advantage of the device of the present invention is that it consists of few parts, is simple in operation, and may be installed readily in operative association with a vehicle for which it is designed to be used as a signaling device.

Another advantage is that a vehicle may be equipped with two of the devices embodying this invention, one adjacent the front of the vehicle and adapted to signal ahead and the other adjacent the rear of the vehicle and adapted to signal to the rear.

A further advantage is that in normal position of parts the device of this invention is adapted, also, as a tail-light for a vehicle.

Other objects and advantages of this invention are hereinafter mentioned and, furthermore, this invention consists in the construction, arrangement, and combination of parts described in this specification and pointed out in the claims.

In the accompanying drawings forming part of this specification wherein like numbers of reference denote like parts wherever they occur, Figure 1 is a plan view looking at the front of the device of the present invention;

Fig. 2 is a vertical sectional view on a line centrally of Fig. 1 and extending longitudinally of the arrow indicator;

Fig. 3 is a horizontal sectional view of Fig. 1 on a line centrally through the two solenoids;

Fig. 4 is a view showing the solenoids of Fig. 3 and parts associated therewith removed to show the segmental gears and the solenoid supporting bracket adjacent the inner wall of the casing of the device; and Fig. 5 is a diagrammatical view showing the electrical circuits and switch for operating the signaling device of this invention.

Casing 1 may consist of a back-plate 2 and a substantially cup-shaped cover 3, said back-plate and said cover being removably joined together by any suitable means, such, for instance, as by means of screws 4 or the like through flange 5 borne by said back-plate and flange 6 borne by said cover.

The front of cover 3 may be provided with three similar openings 7, 8, and 9, adapted as light-ports and which may have their centers substantially equidistant from the axis of rock-shaft 10 mounted as hereinafter described.

Adjacent each of said openings, cover 3 may bear an outwardly protruding annular flange 11 adapted to receive glass covers or lenses 12, said glass covers being held in position over said openings by means of spring split-rings 13 in a well-known manner. The glass cover or lens 12 of opening 7 may be green in color and the color of glass covers or lenses 12 of openings 8 and 9 may each be red.

A case-hardened bushing 14 may be borne in an appropriate opening formed in the front of cover 3, said bushing being adapted as a bearing for the adjacent end-portion of rock-shaft 10 mounted therein, said rock-shaft having one end extending outwardly of said cover through said bushing and having its other end pivotally mounted on pad 15, said pad being borne by the inner wall of casing-back 2. One end of indicator-arrow 16 or the like is secured to the outer end of rock-shaft 10 outside of casing 1, the shaft of said indicator-arrow being provided with an opening 17 adapted to register with light-ports 8 and 9, respectively, when said indicator-arrow is swung to a position over said ports when said rock-shaft is rocked as hereinafter described.

Shutter 18 is rigidly mounted on rock-shaft 10 within casing 1 and is adapted to cover an opening 7, 8, or 9 and shut off the passage of light therethrough from within as the shutter is moved to a position in front of one of said openings as said rock-shaft is rocked in the manner hereinafter described. In the normal position of parts indicator-arrow 16 depends substantially perpendicularly downward from rock-shaft 10 outside of casing 1 and points in a direction opposite to light-port 7, as shown in Figs. 1 and 2, said indicator-arrow being then in the position, which it normally assumes and holds by force of gravity, shutter 18 being mounted on rock-shaft 10 in such a position relative to indicator-arrow 16 that when said indicator-arrow is in said normal position, said shutter will be in its normal position wherein it covers light-port 7 and shuts off light therethrough from within casing 1.

Segmental gear 19 is rigidly secured to the inner end of rock-shaft 10 adjacent pad 15 and segmental gear 20 adapted to mesh with segmental gear 19 is secured to one end of space collar 21, said space collar being rotatably mounted on pin 22, said pin being rigidly supported by being screwed into or otherwise secured to pad 23, which pad is secured to the inner wall of casing-back 2.

To the other end of said space collar, balance lever 24 is rigidly secured intermediate the two ends of said lever, the arrangement of parts being such that when said balance lever is actuated to cause space collar 21 to rock segmental gear 20, said movement will be communicated to segmental gear 19 and rock-shaft 10 will be rocked correspondingly.

Bracket 25 may be secured to pad 26 by means of screws 27 or the like, said pad being borne by the inner wall of casing-back 2, said bracket being adapted to support a pair of solenoids 28 and 29, which may be secured to said bracket in any suitable manner. Cores or plungers 30 and 31 of solenoids 28 and 29, respectively, are hollow with open tops and closed bottoms, as shown in Fig. 3, links 32 and 33 having one of their ends pivotally mounted within the hollow portions of said cores, respectively, and having their other ends extending outwardly of said hollow portions and pivotally attached to adjacent ends of balance lever 24. Set-screws 34 and 35 extending upwardly through bracket 25 into solenoids 28 and 29, respectively, are adapted as adjustable stops for adjusting the length of pull or stroke of plungers or cores 30 and 31, respectively, downwardly into their respective solenoids, jam-nuts 36 and 37 being adapted for locking said set-screws in an adjusted position.

A suitable construction of segmental gears 19 and 20 is one in which the diameter of gear 19 is substantially one-half that of 20.

An electric lamp 38 or the like may be provided supported within casing 1 by means of bracket 39, which may be borne by solenoids 28 and 29, the position of said lamp being substantially directly opposite and in line with light-port 7, there being a reflector 40 adjacent light-ports 8 and 9 and borne by the inner wall of casing cover 2, said reflectors being adapted to reflect light from lamp 38 through said light-ports 8 and 9, when said light-ports are not covered by shutter 18, it being, of course, understood that lamp 38 is wired electrically in connection with a source of electric energy borne by the vehicle on which the signaling device of this invention is equipped and that lamp 38 is constantly lighted when the vehicle and said device is in use at night.

Fig. 5 is a diagrammatical view showing the electric circuits adapted for operating the signaling device of this invention, battery 41 or some other source of electric energy being borne by any suitable part of the vehicle (not shown) equipped with the signaling device and switch 42 being mounted within convenient reach of the operator, the position of switch 42, as shown in the drawings, being the neutral position in which the parts of the device are in the normal positions shown in the drawings.

In daylight the signals are observed by the position of indicator-arrow 16, the normal position of said indicator, shown in Figs. 1 and 2, being adapted to indicate that the vehicle bearing the device is to proceed straight ahead. At night that position of the indicator-arrow is indicated by the light shining through the normally open light-ports 8 and 9, with shutter 18 in its normal position of closing light-port 7.

To warn traffic that the driver intends to turn his vehicle around a corner to the right or left, the operator will throw switch 42 in the appropriate direction to one or the other of the two contact points 43 and 44 whereupon the corresponding solenoid will be energized, causing its plunger to be drawn inwardly of said solenoid thus causing the corresponding link 32 or 33 to actuate balance lever 24 to rock space collar 21, whereby segmental gear 20 and 19 will be correspondingly rocked, the rocking of gear 19 in turn causing rock-shaft 10 to be rocked, whereby indicator-arrow 16 will swing to the right or left, accordingly as one or the other of said pair of solenoids is energized, until hole 17 substantially registers with one or the other of the two light-ports 8 and 9, and until shutter 18 swings away from light-port 7 and covers one or the other of the two light-ports 8 and 9, so that in the position of parts indicating an intention to turn the vehicle to the right or left, indicator-arrow 16 will have its opening 17 substantially registering with one of the two light-ports 8 and 9, and shutter 18 will swing to a position shutting light off from within through the other of said two light-ports 8 and 9, light-port 7 being open and unobstructed, so that at night time the inclined position of indicator-arrow 16 designating an intention to turn the vehicle will be indicated by light shining through green light-port 7 and through one of the red light-ports 8 or 9, the other of said red light-ports being closed by said shutter.

To restore the parts to normal position indicating a straight-away course for the vehicle, switch 42 is moved to neutral position, shown in Fig. 5, whereupon the energized solenoid is deënergized, its plunger is released and the weight of indicator-arrow 16 acted upon by gravity will cause said indicator-arrow to assume the perpendicular or normal position, thus restoring, also, shutter 18 and all other movable parts to normal positions shown in the drawings.

A signaling device embodying the present invention may be installed at the rear end of a vehicle and another one of these devices may be installed at the front end of said vehicle and the two devices may be wired in a well-known manner in connection with a source of electrical energy so that they will act synchronously in signaling as their solenoids are energized and deënergized, the front device being adapted to indicate to traffic officers and others that the vehicle will proceed straight ahead, to the right, or to the left, as the case may be, and the rear device will simultaneously signal to those to the rear of the vehicle the intended course in which said vehicle is to be driven.

It will be observed that in the normal position of parts, shown in the drawings, the two light-ports 8 and 9, which may be adapted as red lights by the use of red cover glasses or lenses 12, are open to the passage of light from lamp 38, so that in case of a signaling device of this invention mounted at the rear of a vehicle, said red light-ports are adapted as a pair of tail-lights on a normal straight-away course of the vehicle, and, that, whenever the parts are moved to a position indicating that the vehicle is to turn to the right or left, one or the other of said red light-ports will show light therethrough thus providing a suitable tail-light.

Moreover, as stated above, light-port 7 may be provided with a green cover glass or lens 12, so that when said light-port is open for the passage of light therethrough from lamp 38 it will show a green light, which green light will show only when the parts are moved to a position indicating that the vehicle is to be turned toward the right or left, the direction of the turn being indicated by the position relative to said green light that one of the red lights 8, 9 is shown, that is, green light 7, when illuminated is adapted as a pilot light, and by permitting one of the red lights 8, 9, to be illuminated and the other of said red lights to be darkened by shutter 18, the position of the illuminated red light with reference to the green pilot light will indicate the direction in which the vehicle is to be turned.

It is, of course, understood that one lamp 38 may be provided or that a plurality of lamps (not shown) may be used in place of said one lamp and that the position of lamp 28 or a plurality of such lamps may be varied within casing 1 in any suitable manner adapted to provide light for illuminating light ports 7, 8, and 9 in operating the device of this invention.

Various changes in the construction, arrangement, and combination of parts may be made without departing from the nature and spirit of the present invention.

It is to be understood that the claims are not limited to the specific colors mentioned therein.

I claim:

1. In a signaling device for vehicles, a casing including a cover, said cover having parallel red light openings, and a green light opening disposed above the red light openings, a shaft carrying a shutter adapted to normally cover the green light opening and an indicating arrow having an opening adapted to register with either of the red light openings, and means for moving the shaft to permit the shutter to uncover the green light opening and simultaneously cover one of the parallel red light openings.

2. In a signaling device for vehicles, a casing including a cover, said cover having parallel red light openings and a green light opening disposed above the red light openings, an indicating arrow having an opening adapted to register with either of the red light openings, means for moving the arrow, and means for simultaneously closing the red light opening opposite that in register with the opening in the arrow.

3. In a signaling device for vehicles, a casing including a cover, said cover having parallel red light openings, a green light opening disposed above the red light openings, a shaft extending through the casing, a shutter operating within the casing and supported by the shaft, an indicating arrow supported on the shaft and operating exteriorly of the casing, said indicating arrow having an opening adapted to register with either of the red light openings, said shutter adapted to normally close the green light opening, and means for operating the shaft for moving the arrow opposite one of the red light openings, and simultaneously moving the shutter to close the opposite red light opening.

In testimony whereof I hereunto affix my signature.

ALFRED E. D'HARLINGUE.